Feb. 24, 1970  A. OSDOR  3,496,996
APPARATUS FOR PROVIDING LARGE SURFACE AREA DIRECT
CONTACT BETWEEN A LIQUID AND ANOTHER FLUID
Filed July 5, 1968  3 Sheets-Sheet 1

INVENTOR
ASRIEL OSDOR

BY
ATTORNEY

INVENTOR
ASRIEL OSDOR
BY
ATTORNEY

INVENTOR
ASRIEL OSDOR
BY
ATTORNEY

United States Patent Office 3,496,996
Patented Feb. 24, 1970

3,496,996
APPARATUS FOR PROVIDING LARGE SURFACE AREA DIRECT CONTACT BETWEEN A LIQUID AND ANOTHER FLUID
Asriel Osdor, Tel-Aviv, Israel, assignor to Hydro Chemical & Mineral Corp., New York, N.Y., a corporation of Delaware
Filed July 5, 1968, Ser. No. 742,789
Claims priority, application Israel, Aug. 25, 1967, 28,565
Int. Cl. F28b 3/00; A23c 3/04; B01d 47/00
U.S. Cl. 165—111                                            13 Claims

ABSTRACT OF THE DISCLOSURE

Apparatus for providing a large surface area of direct-contact between a first liquid, called the wetting liquid, and an other fluid (or fluids), called the not-wetting fluid, comprises a chamber having a plurality of vertically-extending guide elements across which the wetting liquid forms flowing bridging films defining a plurality of conduits through which the non-wetting fluid flows in direct contact with the wetting liquid of the bridging films. A number of guide elements are disclosed, including ribbed sheets, corrugated sheets, and rods. The apparatus is particularly useful as a direct-contact heat-exchanger, but may be used in other applications, e.g., in liquid-liquid extraction processes, or liquid-gas absorption processes.

BACKGROUND OF THE INVENTION

Field of the invention

The present invention relates to apparatus and processes for providing direct contact between a liquid and one or more other fluids. The invention is especially useful with respect to heat exchangers, such as are used in distillation systems for the desalination of saline water or for brine concentration, and is therefore described with respect to this particular application. The invention may, however, be used in other applications, for example, liquid-liquid extraction operations and liquid-gas absorption operations, as briefly described below.

Description of the prior art

A number of techniques have heretofore been devised, particularly in heat-exchangers, for providing direct contact between a liquid and another fluid. For example, one known type of direct-contact heat-exchanger provides direct contact between one liquid and drops of another immiscible liquid, e.g., oil of different density. Another known arrangement effects direct contact between a liquid and a fluid by causing the liquid to flow as surface coatings along guide elements, such as sheets or rods, and causing the fluid to flow in direct contact with the liquid. While such known arrangements have many advantages over the indirect-contact type of heat exchanger, e.g., in reducing heat losses caused by corrosion of heat-exchange surfaces, nevertheless they still leave many things to be desired in the way of providing a large heat-exchange capacity in a compact unit.

SUMMARY OF THE PRESENT INVENTION

An object of the present invention is to provide an improved apparatus for effecting direct contact between a liquid and one or more other fluids having advantages over the prior known techniques in the above respects.

According to the invention, apparatus for effecting a large surface area direct-contact between a first liquid and another fluid, includes a chamber having an inlet and an outlet for the first liquid and an inlet and an outlet for said other fluid; and a plurality of vertically-extending, horizontally-spaced guide elements, disposed in the chamber, each element having two or more vertically-extending guide surfaces wettable by the first liquid. Each of said guide surfaces faces, and projects in a horizontal direction toward, a guide surface of an adjacent guide element so that the spacing between the guide surfaces of adjacent elements is the minimum spacing between the adjacent elements. The apparatus further includes means directing the first liquid from its inlet to the guide elements to form vertically flowing bridging films of the first liquid, each film having two free faces and bridging a pair of adjacent guide surfaces of two guide elements. The said directing means causes the bridging films to form a part of the wall section of each of a plurality of vertically extending conduits with the liquid constituting the bridging film between the guide surfaces of two guide elements being separated by a part of the guide elements from the liquid constituting the bridging film between the guide surfaces of any other pair of guide elements, including a pair of one of said two guide elements with a third one. The apparatus further includes means directing the other fluid to flow through said conduits in direct contact with the bridging films.

Various types of guide elements may be used. In one embodiment they are in the form of spaced vertical sheets provided on one or both faces with vertically extending ribs forming the wettable guide surfaces. In another embodiment, they are in the form of spaced, vertical, corrugated sheets, the apices of the corrugatiions of adjacent sheets facing each other and forming the wettable vertically-extending guide surfaces. In yet another embodiment; they are in the form of vertically-extending rods, the facing surfaces of a pair of adjacent rods constituting the wettable guide surfaces and being wetted by the first liquid, while the portions of the rods between the guide surfaces are not wetted by the first liquid.

It is thus seen that, according to the invention, one liquid (hereinafter sometimes called the "wetting liquid") is used to form a plurality of conduits for the other fluids or fluid (hereinafter sometimes referred to as the "non-wetting fluid"), a part of the wall section of the conduit being formed by bridging films of the wetting liquid. These bridging films have two free faces both of which are brought into contact with the non-wetting fluid or fluids. A number of advantages are provided by this arrangement, including the following:

First, this arrangement enables the formation of a very large direct-contact surface between one liquid and the other fluid per unit weight of the guide elements.

Further, this arrangement enables a liquid to be brought into direct contact with more than one other fluid. Since the wetting liquid constitutes a part of the walls of the conduits through which the non-wetting fluid is passed, which part of the walls has two free faces made of the first liquid, one fluid can be brought into contact with one face, another with the other face, as will be more fully described below.

In addition, the guide elements used in the present invention may be installed and removed for maintenance or replacement purposes more easily and less expensively than the guide elements in most of the previously known direct-contact arrangements, or the tube nests in the indirect-contact arrangements.

Very stable and controllable bridging films are formed by this arrangement, provided the liquid constituting the bridging film between the guide surfaces of two guide elements is separated by a part of the guide elements from the liquid constituting the bridging film between guide surfaces of any other pair of guide elements, and also between those of one of the pair of guide elements with a third one. In the case where the guide elements are in the form of ribbed or corrugated sheets, the foregoing condition is effected even should the complete surface of the guide elements (i.e. including their non-guide surfaces as hereinbefore defined) be wetted and coated by the wetting liquid. However, when the guide elements are in the form of rods, to obtain this condition the portions of the rods between the guide surfaces should not be wetted by the wetting liquid. This will be more apparent from the detailed description below of several embodiments of the invention. Further features and advantages of the invention will be apparent from the description below.

BRIEF DESCRIPTION OF THE DRAWINGS

The invention is herein described, somewhat diagrammatically and for purposes of example only, with reference to the accompanying drawings illustrating several embodiments of the invention, in which.

DESCRIPTION OF THE PREFERRED EMBODIMENTS

Figure 1:
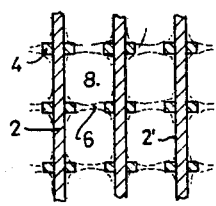
FIGS. 1–3 are diagrammatic views illustrating three apparatus constructions in accordance with the invention wherein the guide elements are in the form of sheets.

The apparatus diagrammatically illustrated in FIG. 1 includes a plurality of sheets 2 extending vertically in a chamber (not illustrated) and horizontally spaced from each other. Each of the sheets 2 is formed with a plurality of vertically extending ribs 4 on both faces, the ribs of adjacent sheets being aligned with each other. The spacing between aligned ribs 4 is the minimal spacing between the adjacent sheets 2. The wetting liquid is directed to the ribs (e.g., by an arrangement described below with respect to FIG. 10) so as to form bridging films 6 bridging each part of aligned ribs 4. These bridging films 6, together with the sheets 2, thus form in effect a plurality of conduits extending vertically through the apparatus, the space within the conduit being designated 8 in FIG. 1. Another fluid (i.e., the "non-wetting fluid") is directed to flow through the spaces 8 within the conduits in direct contact with the wetting liquid forming the bridging films 6.

This arrangement provides a very large contact surface between the liquid of the bridging films 6 and the fluid flowing through the conduits (i.e., spaces 8) formed by these films. The equal surface tension of the wetting liquid on the two free faces of the bridging film maintains the bridging films intact even under low rates of application of the liquid.

As one example, the wetting liquid forming the bridging film 6 may be paraffin, a polyphenyl, or another hydrocarbon, and the non-wetting fluid directed to flow through the spaces 8 within the conduits formed by the bridging films may be water, or a gas such as nitrogen or water vapor. The paraffin in this case may be a heating or heated media, to heat or to be heated by the other fluid in a heat-exchange process. The distance between the ribs in adjacent sheets, and between the ribs in the same sheet, may be about 5 mm., and the thickness of each may be about 1 mm.

It will be appreciated that the expression "wetting" and "non-wetting" as used hereinafter are relative terms.

A "wetting" liquid in the context of the present description is intended to mean one that provides preferential wetting properties with respect to the guide elements, more particularly their guide surfaces (e.g., the wettable surfaces including ribs 4 in FIG. 1) bridged by the liquid, compared to the "non-wetting" liquid or fluid. For example, water would be non-wetting relative to paraffin, but would be wetting relative to a gas or a vapor such as nitrogen or steam.

Figure 2:
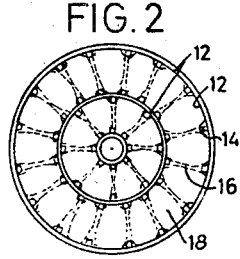

FIG. 2 illustrates a similar construction as FIG. 1 except here the sheets 12 are arranged as coaxial cylinders of different diameters, their ribs 14 being spaced from each other in a radial direction. These ribs are bridged by the bridging films 16 of the wetting liquid to form a plurality of the vertical conduits through the spaces 18 of which flows the other fluid.

Figure 3:
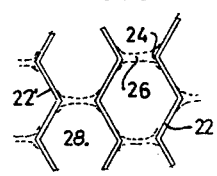

In FIG. 3, the guide elements are in the form of corrugated sheets 22 extending vertically through the apparatus and spaced horizontally from each other. The apices 24 of the corrugations of adjacent sheets face each other and form the wettable vertically-extending guide surfaces bridged by the bridging films 26 of the wetting liquid. The non-wetting fluid is directed to flow through the spaces 28 of the conduits defined by the bridging films 26 and the corrugated sheets 22. The corrugated sheets 22 could also be arranged in the form of coaxial cylinders as in FIG. 2.

Figure 4:
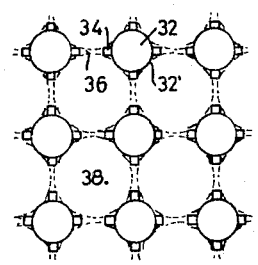
FIGS. 4–9 are diagrammatic views of other constructions in accordance with the invention wherein the guide elements are in the form of rods.

FIG. 4 illustrates the use of a plurality of vertically-extending rods 32 for the guide elements. Each of the rods includes four vertically-extending ribs 34 which are aligned with the ribs of adjacent rods so as to provide a gap between each pair of ribs for supporting the bridging films 36. The non-wetting fluid is directed to flow through the spaces 38 of the conduits formed by the bridging films 36 and rods 32 in the manner described above.

Figure 5:
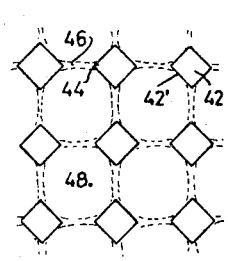

In FIG. 5, the rods 42 are of rectangular cross-section, the corners 44 of each rod facing that of the adjacent rod so as to provide the gap for the bridging film 46 of the wetting liquid. As in the case of FIG. 4, the other fluid is directed to flow through the spaces 48 of the conduit defined by the bridging films 46 and the rods 42.

Figure 6:
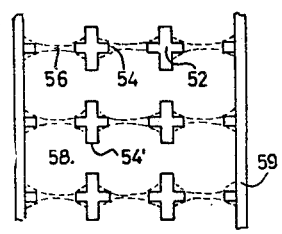

In FIG. 6, the guide elements are in the form of rods 52 of "+" section wherein the extremities 54 of a pair of opposed arms or ribs are aligned with those of adjacent rods to form the gaps supporting the bridging films 56 of the wetting liquid. It will be noted, however that in FIG. 6 the extremities of the second pair of opposed arms or ribs 54' are not bridged by the wetting liquid so that the conduits, defined by spaces 58 through which the non-wetting fluid flows, extend all the way to the walls of the jacket 59 of the chamber in which these guide elements are disposed. A similar arrangement could of course also be used with respect to the other forms illustrated, and likewise all the ribs in the form of FIG. 6 could be used for supporting bridging films.

Figure 7:
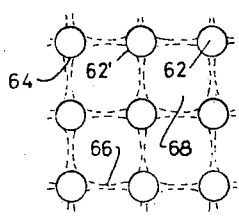

In FIG. 7, the rods 62 are of circular cross-section with opposed aligned surfaces 64 of adjacent rods forming the gaps bridged by the wetting liquid 66, the non-wetting fluid flowing through the spaces 68 between the films.

Figure 8:
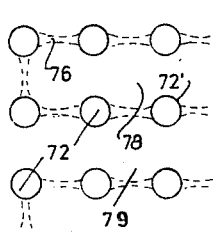

In all the foregoing arrangements illustrated, more than one different non-wetting fluid may be directed to flow through different ones of the conduits formed by the bridging films, and in this manner different non-wetting fluids may be brought into direct contact with the wetting liquid in the same apparatus. Another manner of bringing different non-wetting fluids into direct contact with the wetting liquid is by the use of an arrangement such as illustrated in FIG. 8. Here, the guide elements (shown in the form of rods 72, but which may be of any of the other forms illustrated in FIGS. 4–6) are arranged so that a space 79 is formed between the conduits 78 defined by the bridging films 76 and the rods 72. One non-wetting fluid may be applied through the conduits 78, and another non-wetting fluid of approximately the same density may be applied through the spaces 79 between the conduits, both fluids thus coming into direct contact with the wetting liquid of the bridging films 76. On the other hand, when using the sheets (FIGS. 1–3) for the guide elements, different non-wetting fluids of different densities may be passed through different rows of conduits separated from each other by the sheets.

As indicated earlier, it is important that the liquid constituting the bridging film between the guide surfaces of two guide elements be separated by a part of the guide elements from the liquid constituting the bridging film between the guide surfaces of any other pair of guide elements. By any other pair is also meant a pair of one of the two guide elements with a third one. Only when such an arrangement is provided can the wetting liquid forming the bridging films be controlled and the bridging film maintained intact. When sheets are used (FIGS. 1, 2 or 3), the sheets themselves assures that this arrangement will be maintained even should the wetting liquid be applied at such large rates that it wets and coats the surfaces (2′, 12′ and 22′ in FIGS. 1, 2 and 3 respectively) between the bridging films. That is to say, when sheets are used the liquid forming the bridging films cannot flow from any one pair of sheets to another pair of sheets, since this is prevented by the sheets themselves. Thus, when sheets are used, the complete surfaces of the sheets (i.e., including surfaces 2′, 12′ and 22′) may if desired be wetted and coated by the wetting liquid, and the flow of the wetting liquid will still be controllable to provide stable bridging films.

This is to be distinguished, however, from the case where rods (e.g., FIGS. 4–8) are used. If the rods were completely wetted and coated by the wetting liquid which forms the bridging films, the bridging films between each pair of rods would not be separated from those of the other pairs, as in the case of the sheets. It has been found by experimentation that the bridging films so formed would be very unstable and easily destroyed, since the films bridging different guide elements would not be isolated from each other, and the wetting liquid would tend to flow from one rod to the next. Furthermore, in such a case the surface tension of a bridging film between one pair of guide elements would tend to destroy the other bridging films bridging each one of that pair to adjacent guide elements. For the above two reasons the wetting liquid would flow along the rods in an uncontrolled manner, and also part of the wetting liquid may break away from the guide elements.

In order to provide stable bridging films when rods are used as the guide elements, it is important that the complete surfaces of the rods not be wetted and coated by the wetting liquid, but rather that only the guide surfaces of the rods be wetted, the surfaces between the bridging films being unwetted by the wetting liquid. Thus, the surfaces 32′, 42′, 54′, 62′ and 72′ of the rods in FIGS. 4–8, respectively, which are between the bridging films, should not be wetted by the wetting liquid. In this manner each bridging film is isolated from the others and therefore cannot be affected by the others.

Figure 9:
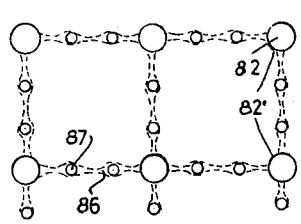

FIG. 9 illustrates a further arrangement, wherein rods 82 of circular cross-section or any of the other described cross-sections are used and support the bridging films 86. In this variation, however, a few smaller-diameter rods 87 are disposed in the gap between the surfaces of the rods supporting the bridging films. These smaller-diameter rods 87 may be completely coated by the wetting liquid without destroying the stability of the bridging film, so long as the spaces 82′ of the main rods 82 supporting the bridging films are not coated, as described above with respect to FIGS. 4–8.

Figure 10:
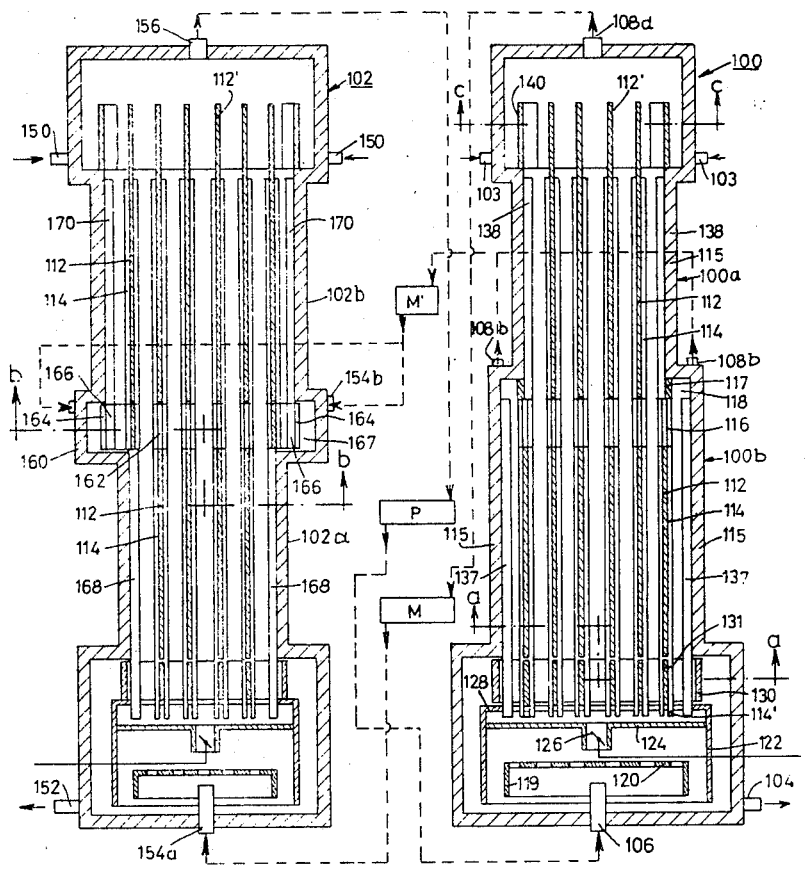
FIG. 10 is a sectional view illustrating two heat-exchangers constructed in accordance with the invention and including ribbed sheets for the guide elements.

FIG. 10 illustrates a proposed design of a system including two heat-exchangers each constructed in accordance with the present invention. This system is particularly designed for use in the multi-stage distillation system described in my copending patent application S.N. 742,865 filed July 5, 1968 and includes two heat-exchangers, 100 and 102, of substantial the same but not identical construction. In heat-exchanger 100, an up-flowing cold oil (the wetting liquid) is heated by down-flowing hot distilled water (the non-wetting fluid); whereas in heat-exchanger 102, the heated oil (the wetting liquid) is caused to flow upwardly through the heat-exchanger to heat cold saline water (the non-wetting fluid). For reasons described in the above-identified copending application (which reasons are not essential for an understanding of the present invention), the oil flows between heat-exchangers 100 and 102 in a main central path in one or more other paths or sub-cycles each operating at a distinct temperature range from the others; also, each heat-exchanger is divided into a plurality of sections of different horizontal cross-sectional areas occupied by the guide elements supporting the bridging films. (The above-identified copending application describes two sub-cycles of the oil and three different sections of the heat-exchangers, whereas only one sub-cycle of the oil and two sections of the heat-exchangers are illustrated herein for purposes of simplifying the present description, but the general principles remain the same.)

With reference to heat-exchanger 100, it includes two sections 100a and 100b, the latter being of larger cross-sectional area than the former. The hot distilled water (the non-wetting fluid) is introduced through inlets 103 at the top and exits cold through outlet 104 at the bottom. The oil (the wetting liquid) is introduced through inlet 106 at the bottom, and a portion exits through outlet 108b at the end of section 100b of the heat-exchanger, while the remainder exits through outlet 108a at the end of sections 100a. The guide elements within the heat-exchangers are of the type illustrated in FIG. 1, namely, including vertically-extending sheets 112 formed with ribs 114 on the opposite faces. There is a group of such ribbed sheets in section 100a of the heat-exchanger, and a larger group in section 100b. The two groups of ribbed sheets are joined together by a plurality of short rods 116 of "+" section (of the type illustrated in FIG. 6) in alignment with the ribs of the sheets. The short rods 116 are located at the top of the lower section 100b. Just above the rods, the jacket 115 of section 100b joins with that of section 100a, and depending from the interior surface of this juncture is an annular plate 117 in alignment with the jacket 115′ of section 100a. This annular plate provides an annular space 118 in which a portion of the oil coalesces before it exits through outlet 108b.

At the bottom end of heat-exchanger 100, through which the oil is introduced, there is provided an inverted cup 119 having an end wall 120 formed with a plurality of apertures, and a second inverted cup 122 having an end plate 124 formed with a central aperture in which is disposed a butterfly valve 126. The lower ends of the sheets 112 terminate 10 to 20 cm. above partition 128 spaced slightly above plate 124, but the ribs 114 extend below the lower ends of the sheets and pass through slots formed in partition 128, each slot being aligned with a row of the rib projections 114′. Disposed above partition 128 and supported by it are a plurality of elongated sleeves 130 located at right angles to the sheets 112 and formed with partitions 131. The sleeves 130 are aligned with the ribs 114 of the sheets, and the rib projections 114′ pass through the sleeves on both sides of the sleeve partitions 131 (FIG. 10a).

Figure 10C:
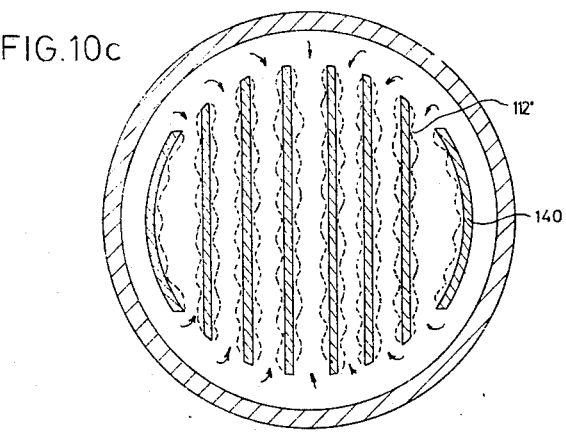
FIGS. 10a, 10b and 10c are enlarged horizontal sectional views along lines a—a, b—b, and c—c of FIG. 10, respectively.
Figure 10A:
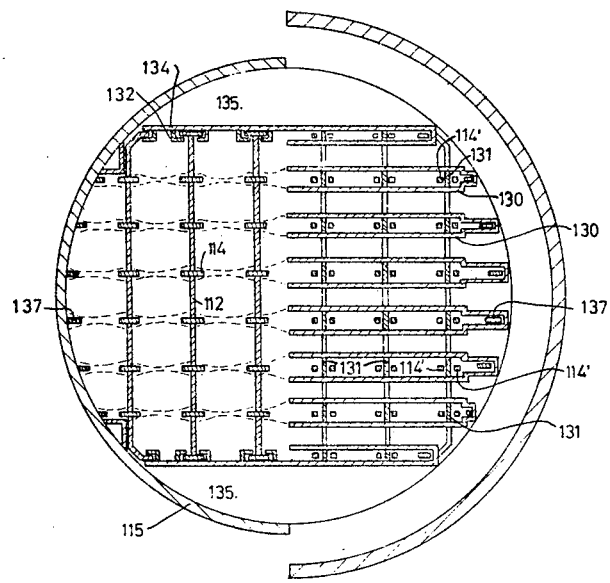

The sheets are supported in section 100b of the heat-exchanger by a plurality of channel members 132 fixed to the inner surfaces of a pair of supporting plates 134 at the opposite sides of section 100b of the heat-exchanger as shown in FIG. 10a. Channel members 132 receive the flanged ends of the sheets 112 and securely hold them in position. The space 135 between supporting plates 134 and the heat-exchanger jacket 115 in section 100b may be filled with an inert liquid, such as the same material as used for the wetting oil. It will be appreciated that this space and the width of plates 134 are somewhat exaggerated in FIG. 10a since the curvature of the jacket in a typical design, where the diameter would be several meters, would be much less than that illustrated. In practice the greatest part of the sheets 112 will be supported by channel members 132 fixed directly to the inner surface of the jacket 115.

Section 100a of the heat-exchanger is of substantially the same construction, but of smaller cross-sectional area, than section 100b and does not include the supporting plates 134. Channel members 132 and 132′ (shown in FIG. 10b) are fixed to the inner surfaces of the heat-exchanger jacket for supporting the ribbed sheets 112. In this upper section 100a there are only four such sheets, whereas in the lower section 100b there are six. As indicated earlier, the ribs of the upper sections are joined by the short rods 116 to the aligned ribs of the lower section so that the bridging films of the wetting liquid passing between said ribs through the lower section 100b will continue to flow through the upper section 100a. The remaining bridging films flowing through lower section 100b will coalesce within the spaces 118 and the oil will exit through 108b.

On the opposed inner surfaces of jacket section 100b, opposite to the sides of the jacket carrying the supporting plates 134, there are provided a plurality of rods 137 each in alignment with a rib 114 of an end sheet 112. These rods cooperate with the end ribs in supporting the bridging films of the end ribs. A similar plurality of rods 138 are provided in jacket section 100a for supporting the bridging films of the end ribs in that section.

In operation, the cold wetting oil is introduced through inlet 106, passes through the apertured wall 120 of inverted cup 119, and then through butterfly-valve 126 of plate 124. The foregoing elements provide for a uniform and regulated flow of the oil. The slots formed in partition plate 128 and the sleeve 130 direct the oil to flow between the rib projections 114′ and to form bridging films across the gaps between these rib projections. These bridging films of the oil flow upwardly (by buoyancy, in this example, since the wetting oil is lighter than the down-flowing hot distilled water introduced at the upper end of the heat-exchanger), forming the conduits for the down-flowing distilled water as described above (particularly with respect to FIG. 1).

At the top of the heat-exchanger, the ribs 114 on sheets 112 terminate, and the sheets include unribbed upper extensions 112′ ending at about the same level as the upper surfaces of a pair of curved baffle plates 140. The wetting oil bridging films rise to the upper ends of the ribbed sheets 112, and then the liquid continues to flow along the wettable extensions 112′ (FIG. 10c). The distilled water non-wetting liquid is applied at the upper end, through inlets 103, and flows downwardly through the spaces (e.g., space 8 in FIG. 1) constituting the conduits formed by the bridging films. A part of the oil exits through middle exit 108b, as indicated earlier, and the remainder exits through top exit 108A at a higher temperature; whereas all the distilled water exits through exit 104.

Heat-exchanger 102 is of very similar structure as that of 100 and is used for heating cold saline water introduced at the top through inlets 150 and exiting at the bottom through outlet 152.

Heat-exchanger 102 operates at a lower pressure than heat-exchanger 100, and therefore the oil exiting through outlet 108a passes through a power generator M before it is introduced into the bottom inlet 154a of heat-exchanger 102. Similarly, the hot oil exiting through outlet 108b of heat-exchanger 100 passes through another power generator M′ before it is introduced into inlet 154b at the juncture between the two portions 102a and 102b of heat-exchanger 102. All the wetting oil, now in a cold condition, exists through outlet 156 at the upper end of heat-exchanger 102 and passes through a pump p where its pressure is increased before introduction through inlet 106 at the lower end of heat-exchanger 100.

Figure 10B:
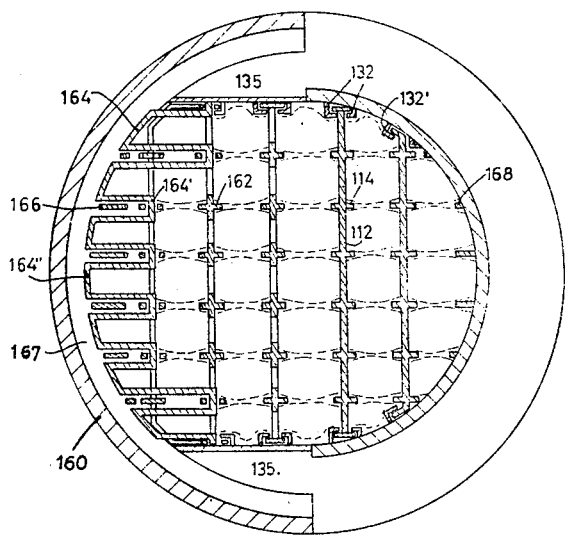

The juncture 160 between the two sections of heat-exchanger 102 is shown in FIG. 10b, and it will be seen that it is of slightly different construction from that of heat-exchanger 100. In heat-exchanger 102, the oil rises from one section (102a) having a number (e.g., four) of ribbed sheets 112 to the upper section (102b) having a larger number (e.g., six) ribbed sheets. The sheets in the two sections are joined by rods 162 similar to rods 116 in heat-exchanger 100. Rods 162 are aligned wth the four sheets of the lower section 102a and the middle four sheets of the upper section 102b. These four sheets of both sections are supplied by the oil from inlet 154a. The two end sheets of the upper section, however, are supplied by the oil from inlet 154b. For this purpose, two opposite ends of the juncture 160 are provided with a baffle 164 of sinuous configuration (FIG. 10b), i.e., having a plurality of inwardly and outwardly facing bends. The inner bend extremities 164′ of the baffle are aligned with the end sheets 112, the outer ribs 114 being aligned with the spaces just inside of these bends. A plurality of rods 166 are attached to the heat-exchanger jacket and are disposed in the spaces between the outer bend extremities 164″ of the baffle aligned with the outer ribs 114 of the sheets. The oil is thus directed to pass from inlet 154b through the space 167 between the outer jacket and baffle 164, to the gaps between rods 166 and the outer ribs 114 of the outer sheets 112. All the oil (i.e., that introduced through inlets 154a and 154b) rises to the top of section 102b where the ribs 114 terminate, and the oil then continues upwardly by wetting the unribbed extensions 112′ of the sheets, and finally exits through outlet 156, as described above with respect to heat-exchanger 100.

A plurality of rods 168 are provide on the opposed inner surfaces of jacket section 102a, similar to rods 138 of jacket section 100a, for supporting the bridging films with the end ribs, and a second plurality of rods 170 are provided in section 102b, similar to the rods 137 of section 100b, for supporting the bridging films with the end ribs in that section. Rods 170 are preferably integral with rods 166, the latter being slightly wider to better ensure formation of the bridging films.

It will be appreciated that while in both heat-exchangers 100 and 102 the wetting liquid is lighter than the non-wetting liquid, in which case the wetting liquid rises and therefore must be introduced in the bottom of the heat-exchanger and removed from the top, the apparatus could also be used with wetting liquids which are heavier than the non-wetting fluid, in which case the wetting liquid would be introduced at the top. In such case, substantially the same structure could be utilized, except that the heat-exchanger would be inverted so that the elements for directing the wetting liquid to form the bridging films would be disposed at the top of the heat-exchanger rather than at the bottom.

The provision of the sleeves 130 is particularly important when the heat-exchanger is used in an application where the non-wetting fluid includes both a liquid and a gas or vapor (both non-wetting fluids being lighter than the wetting liquid), in which case the heat-exchanger would be inverted as indicated above. An interface would be formed between the liquid and gas or vapor phases of the non-wetting fluids, and if the sleeves 130 were not present, the bridging films formed by the wetting liquid would tend to break up as they passed through this interface. However, by providing sleeves 130 so that they extend through this interface between the liquid and the gas or vapor phases of the non-wetting fluids, the bridging films would not pass through the interface and therefore would not tend to break up.

Figure 11:
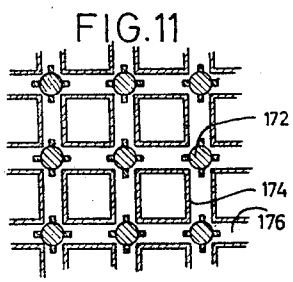
FIG. 11 is a horizontal sectional view of a portion of another heat-exchanger constructed in accordance with the invention and utilizing rods for the guiding elements.

FIG. 11 illustrates an arrangement for directing the wetting liquid to the guide elements when rods are used for the guide elements. The rods 172 in FIG. 11 are of the ribbed-circular type illustrated in FIG. 4, but may also be of any of the other types ilustrated in FIGS. 5–7.

In order to form the bridging films between the rods 172, the apparatus includes a plurality of sleeves 174 of rectangular section disposed in the spaces between the rods and aligned with the rods. The non-wetting fluid (or fluids) flows through the sleeves 174, while the wetting fluid is directed by the outside surfaces of the sleeves to the spaces 176 between the sleeves and in this manner forms the bridging films between adjacent rods. It will be appreciated that the sleeves 174 are provided at the end of the apparatus through which the wetting fluid is introduced, i.e., at the lower end in the case of the apparatus illustrated in FIG. 10.

As indicated earlier, the apparatus of FIG. 10 (as well as that of FIG. 11) could also be used in applications where the non-wetting fluid includes both a liquid phase and a gas or vapor phase. One example is a vaporization column, such as may be used in a brine concentration system or in a water desalination system, where the non-wetting fluid is saline water and its vapor, and the wetting liquid is a heating medium heavier than the saline water (such as "Aroclor") for heating and vaporizing the saline water. Another example is a condensation column, for example in a water desalination system where the non-wetting fluid is water vapor and its condensed water, and the wetting liquid is a cooling medium heavier than the water condensate (such as "Aroclor") for condensing the water vapor.

Since, in the arrangements of the present invention the conduits formed by the bridging films have some similarity to the tube nests of the indirect heat-exchangers, the present invention may also be used in most cases where tube nests are used. It is even contemplated that they could be used in processes analogous to "thin film vaporization" and "thin film condensation," which are known processes but heretofore have been executed only in indirect-contact heat-exchangers. Further, the apparatus of FIG. 10 could also be used advantageously in the critical pressure desalination process as described in my copending application S.N. 360,813, filed Apr. 20, 1968, where the wetting liquid is hydrocarbon at a temperature above 300° C., and the non-wetting fluid is saline water and its produced vapor.

It is seen that, among the other advantages briefly described above, the invention enables the construction of direct-contact fluid handling devices having a very large surface area of direct contact per unit weight of the guide elements. Following is an example of the construction of a heat-exchanger in accordance with FIG. 1 or 10 from which can be calculated the weight of ribbed sheets of steel per meter square of heat-exchange surface. The thickness of the sheets and ribs may be 0.5 mm., the distance between the adjacent sheets may be 7 mm. (the thickness of the sheets included), and the distance between ribs in adjacent sheets and between the ribs in the same sheet may be 5 mm.

A cubic meter may accommodate 1000/7, or 143 sheets of 1 sq. m. with 1000/5, or 200 ribs of 1 m. length on each side. This would be 143×200×2 or 57,200 m. of ribs 0.5 mm. thick and 0.75 mm. wide. The weight of the sheets would be 143×0.5×8, or 572 kgs., and the weight of the ribs would be $$572{,}000 \times 0.005 \times 0.0075 \times 8$$

or 172 kgs. The total weight of the sheets and ribs would be 744 kgs.

Such guiding elements would form approximately (1000/7)×(1000/5), or 28,600 meters of conduits having an inside diameter of approximately 5 mm., 1 cubic meter of the heat-exchanger having a total inner surface of 28,600×0.005×3.14, or 450 sq. m. Consequently, the weight of the sheets and ribs per sq. m. of heat-exchange surface would be 744/450, or 1.65 kgs. Where two direct-contact heat-exchangers are required (FIG. 10), one for heating and one for cooling, approximately 3.5 kgs. of sheets and ribs of 0.5 mm. thickness are needed per meter square of the overall (heating and cooling) heat-exchange surface.

The foregoing devices have been described particularly with reference to applications as heat-exchangers (e.g. for water desalination or for brine concentration), but it will be appreciated that they may be used in other applications, such as in liquid-gas absorption operations, liquid-liquid extraction operations, and the other operations requiring a large area of contact between a liquid and one or more other fluids. An example of a liquid-gas absorption operation would be absorbing ammonia by water, wherein the down-flowing wetting liquid is water and the up-flowing non-wetting fluid is ammonia gas. An example of a liquid-liquid extraction operation would be refining mineral oil, wherein the crude mineral oil is the wetting liquid and flows upwardly, and a solvent such as nitrobenzene is the non-wetting fluid and flows downwardly.

What is claimed is:

1. Apparatus for providing a large surface area direct-contact between a first liquid and an other fluid, comprising: a chamber having an inlet and an outlet for said first liquid and an inlet and an outlet for said other fluid; a plurality of vertically-extending, horizontally-spaced guide elements each having at least two vertically-extending guide surfaces wettable by said first liquid, each of said guide surfaces facing, and projecting in a horizontal direction toward, a guide surface of an adjacent guide element so that the spacing between the guide surfaces of adjacent elements is the minimum spacing between the adjacent elements; means directing said first liquid from its inlet to said guide elements to form vertically flowing bridging films of the first liquid, each film having two free faces and bridging a pair of adjacent guide surfaces of two guide elements, said directing means causing said bridging films to form a part of the wall section of each of a plurality of vertically extending conduits with the liquid constituting the bridging film between the guide surfaces of two guide elements being separated by a part of the guide elements from the liquid constituting the bridging film between the guide surface of any other pair of guide elements, including a pair of one of said two guide elements with a third one; and means directing said other fluid to flow through said conduits in direct contact with said bridging films.

2. Apparatus as defined in claim 1, wherein said guide elements are in the form of spaced vertical sheets at least one face of which is provided with vertically-extending ribs forming said wettable guide surfaces.

3. Apparatus as defined in claim 2, wherein said sheets are arranged as coaxial cylinders of different diameters.

4. Apparatus as defined in claim 1, wherein said guide elements are in the form of spaced, vertical, corrugated sheets, the apices of the corrugations of adjacent sheets facing each other and forming said wettable guide surfaces.

5. Apparatus as defined in claim 1, wherein said guide elements are in the form of vertically-extending rods, the facing surfaces of a pair of adjacent rods constituting said wettable guide surfaces and being wetted by said first liquid, the portions of the rods between said guide surfaces not being wetted by said first liquid.

6. Apparatus as defined in claim 5, wherein said rods are of circular cross-section.

7. Apparatus as defined in claim 5, wherein said rods include ribs constituting said wettable guide surfaces.

8. Apparatus as defined in claim 5, when said rods are of polygonal cross-section, a corner of the polygon of each rod facing that of the adjacent rod and constituting said wettable guide surface.

9. Apparatus as defined in claim 1, wherein said inlet and said outlet for said first liquid are disposed at opposite ends of the chamber with respect to the inlet and outlet for said other fluid, whereby said first liquid flows countercurrently with respect to said other fluid.

10. Apparatus as defined in claim 1, wherein said chamber comprises a plurality of sections of different horizontal cross-sectional areas occupied by said guide elements.

11. Apparatus as defined in claim 1, wherein said first liquid directing means includes a partition at the inlet end of the chamber defining a reservoir for the first liquid, said partition being formed with a plurality of slots each aligned with a row of said guide elements to direct the liquid to the guide surfaces thereof.

12. Apparatus as defined in claim 1, wherein said first liquid directing means includes a plurality of sleeves each aligned with a row of said guide elements to direct the liquid to the guide surfaces thereof.

13. Apparatus as defined in claim 1, wherein said chamber includes a cup-shaped member having a side wall and an apertured wall at one end thereof, the opposite end thereof being open, said cup-shaped member being disposed in the chamber between the inlet end for the first liquid and the means for directing said first liquid to the guide elements with said apertured end wall facing the latter means.

References Cited

UNITED STATES PATENTS 2,447,746  8/1948  Ferris et al. _____ 202—64
3,151,677  10/1964  Thompson et al.

ROBERT A. O'LEARY, Primary Examiner

ALBERT W. DAVIS, Assistant Examiner

U.S. Cl. X.R.

165—115; 261—112; 159—13; 202—236; 203—89